United States Patent [19]

Gilliam et al.

[11] 3,939,029

[45] Feb. 17, 1976

[54] METHOD OF BONDING UTILIZING A HEAT ACTIVATED POLYAMIDE ADHESIVE

[75] Inventors: Kenneth D. Gilliam, Sugar Grove; Carl Serres, Naperville, both of Ill.

[73] Assignee: Standard Oil Company, Chicago, Ill.

[22] Filed: Nov. 16, 1973

[21] Appl. No.: 416,442

[52] U.S. Cl. ............... 156/331; 260/78 S; 428/458; 428/474

[51] Int. Cl.[2] C09J 5/06; C08G 73/10; B32B 27/34; B32B 15/08

[58] Field of Search ............ 156/331; 161/214, 227; 260/78 R, 78 S, 78 SC; 428/458, 474

[56] References Cited

UNITED STATES PATENTS

| | | | |
|---|---|---|---|
| 3,576,691 | 4/1971 | Meyers | 156/309 |
| 3,654,227 | 4/1972 | Dine-Hart | 260/37 N |
| 3,745,149 | 7/1973 | Serafini et al. | 260/65 |
| 3,821,072 | 6/1974 | Campbell et al. | 161/214 |

*Primary Examiner*—Douglas J. Drummond
*Assistant Examiner*—Robert A. Dawson
*Attorney, Agent, or Firm*—Wallace L. Oliver; Arthur G. Gilkes; William T. McClain

[57] ABSTRACT

High strength structural metal-to-metal bonds can be achieved in 10 to 15 seconds by placing a resinous polyamide capable of imidizing between the metal surfaces to be bonded and heating the composite to a temperature sufficiently high ( 400°F) to induce imidization.

10 Claims, No Drawings

METHOD OF BONDING UTILIZING A HEAT ACTIVATED POLYAMIDE ADHESIVE

BACKGROUND OF THE INVENTION

This invention relates to a new and improved method of adhesively bonding two surfaces by the use of polyamide adhesives which are capable of imidizing at the application conditions.

Polyamide resins are well known and widely used in both thermoplastic and thermosetting type adhesive formulations. The hot-melt adhesives or thermoplastic polyamide cements usually consist of a blend of polymer and various modifying agents and are advantageously noted for their ease of application, while the polyimide type adhesive is known for high thermal stability but requires application times in terms of hours, particularly if optimum cementing of steel surfaces is desired. In contrast, the polyamide adhesives of this invention when properly applied will display process characteristic analogous to the hot-melt adhesives in that a high strength bond will be achieved in less than a minute. The adhesive properties will in general be at least twice as high as would be observed if the analogous polyimide were used yet the final product after bonding is categorically the polyimide.

SUMMARY OF THE INVENTION

We have discovered a new method of adhering two surfaces involving the steps of:

a. placing between the surfaces to be bonded a resinous polyamide containing an aliphatic or cycloaliphatic diamine residue of up to about 20 carbon atoms copolymerized with a carboxylic aromatic acid residue having at least 3 carboxyl groups wherein two of said carboxyl groups are linked to said diamine residue through amide bonds and wherein at least one of said remaining unreacted carboxyl groups is in either the acid or ester form attached to a carbon atom which is adjacent to a second carbon atom of the same aromatic ring containing one of the carboxyl groups involved in said amide bond such that said unreacted carboxyl group can imidize with said amide bond, b. heating the surfaces and polyamide such as to induce imidization, and c. cooling the bonded surfaces.

In one aspect of this invention a polyamide resin having the formula:

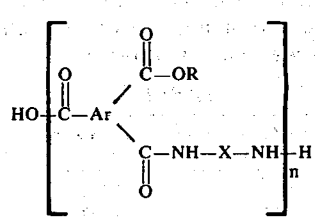

where Ar is an aromatic nucleus having the attached non-polymerized carboxyl group vicinal to at least one of the carboxyl groups involved in an amide linkage, X is an aliphatic or cycloaliphatic hydrocarbon diradical having from about 2 to 20 carbon atoms and R is an alkyl radical of up to 6 carbons or hydrogen, is used to form high strength structural metal-to-metal bonds by heat activation for less than 1 minute. In another aspect of this invention, structural metal-to-metal bonds result in a resinous polymeric material having significant imide containing structure corresponding to the repeating unit:

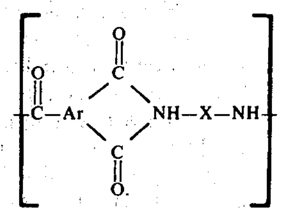

Still another aspect of this invention is a method of adhering surfaces which involves the use of a heat activatable polyamide having the processing advantages of a thermoplastic which results in structural bonds that have the high temperature characteristics of a polyimide. Other aspects of our invention will be apparent to one skilled in the art upon complete reading of the specification and examples.

DESCRIPTION OF THE INVENTION

The adhesives of this invention are resinous polyamide polymers containing an aromatic tricarboxylic acid moiety in such a manner that one of the carboxylic acid groups is available to imidize upon heat activation. These polyamides are characterized as having molecular weights high enough to yield inherent viscosities in excess of 0.2dl/g at 0.10 g polymer per 20 ml of m-cresol at 25°C. Generally, the bulk strength of the adhesive will increase with an increase in molecular weight, thus an inherent viscosity in excess of about 0.25 is preferred.

The aromatic moiety of the polyamides of our invention can be derived from any of the commonly known aromatic molecules having at least three carboxyl groups of which at least two are attached to adjacent (vicinal) carbon atoms of the same ring. Thus, this would include the benzene derived tricarboxylic acids such as 1,2,4-benzenetricarboxylic acid (trimellitic acid) but not 1,3,5-benzenetricarboxylic acid (trimesic acid), the naphthalene derived acids such as 1,2,5-naphthalenetricarboxylic acid, the anthracene derived acids, the substituted benzene, naphthalene and anthracene counterparts and the like. Higher multifunctional aromatic carboxylic acids are also operative and equivalent such as 1,2,5,6-naphthalenetetracarboxylic acid. The preferred aromatic moiety is derived from trimellitic acid.

The diamine moiety of the polyamide resins of this invention can be any of the common aliphatic or cycloaliphatic diamines of up to about 20 carbon atoms. Conveniently, the diamines of up to 12 carbon atoms can be used such as ethylene diamine, 1,6-hexanediamine, 1,12-dodecane diamine, 1,4-cyclohexanediamine and the like. The preferred diamine is 1,6-hexanediamine (hexamethylenediamine).

The polyamides of this invention can be synthesized by many of the methods known to the art provided the resulting polymer has an unreacted carboxyl group vicinal to one of the amide bonds thus being capable of imidizing upon heating. Since the imidized form is undesirable at this stage and since imidization frequently begins at temperature in excess of 150°C, a low temperature polymerization process is preferred. It can be catalytic or non-catalytic. The use of a diluent or solvent or a pair of miscible or immiscible solvents is recommended. One method of particular utility in this invention and therefore preferred is the low temperature (ambient) interfacial polymerization using a pair of immiscible liquids which are individual solvents for different monomers. Thus an aqueous phase containing the diamine in combination with a halogenated hydrocarbon such a chloroform containing the acid anhydride, acid chloride or anhydride acid chloride is preferred. In this method of polymerization the two phases are mixed under high agitation and a fine powder is recovered. This polyamide can be washed, dried and then used directly in the powder form as an adhesive.

In order to achieve the desired high molecular weight the pH should be controlled during the polymerization by the use of an HCl scavenger. For most purposes the use of $Na_2CO_3$ leads to adequate viscosities.

The particular choice of acid form helps promote linearity of the polymeric product and the desired position of the unreacted carboxyl group. Thus in the preferred trimellitic acid derived product the 4-acid chloride anhydride form will result in polymerization through the 4-position on the aromatic ring. Hence a free vicinal carboxyl group in the final polyamide. An alternative to this is to open the anhydride ring with an alcohol forming the mono-ester. This ester can then be converted to the di-acid chloride ester. Upon polymerization the vicinal ester group is available for imidization.

The polyamide adhesives of this invention can be utilized directly as powders or they can be applied in a modified form such as films, fibers and the like provided the modification step does not induce imidization. The adhesive can be placed directly between the surfaces to be bonded and the entire composite can then be heat activated at a temperature sufficient to induce imidization. The amount of adhesive can vary depending on the nature of the surface and its intended use. A 1 to 10 mil thick layer of adhesive is usually adequate for most purposes. A slight compressive force is optional but will promote polymer flow thus causing the adhesive to conform to surface variations. The heat activation step usually requires a temperature in excess of 400°F. Temperatures between 580°F and 820°F will lead to structural metal-to-metal bonds of extraordinary strength within 45 seconds. At the higher temperatures bonds can be achieved as quickly as 10 seconds.

Having thus described the invention the following examples are presented to illustrate specific embodiments but should not be considered unduly limiting.

EXAMPLE I

A polyamide having an inherent viscosity of 0.27 dl/g (0.10 g polymer per 20 ml of m-cresol at 25°C) made by interfacial polymerization of 4-chloroformylphthalic anhydride with 1,6-hexanediamine was vacuum dried and placed between two sheets of steel. Approximately a 5 mil layer of polyamide was used. The steel surfaces with the polymer layer between were heat activated by the use of a Sentinel sealer operated at various temperatures. The bonded surfaces were subsequently cooled and their average Lap Shear and T-Peel adhesive values were measured essentially according to ASTM-B1002-64and ASTM-D1876-69 respectively. A hot rolled steel sheet of 0.064 inch thickness was used for the Lap Shear while a bonderized cold-rolled steel of .026 inch thickness was used for T-Peel. The Sentinel sealer was operated for 15 seconds at 80 psi for Lap Shear and for 5 seconds at 2 psi followed by 10 seconds at 20 psi for T-Peel. The data for the respective application temperatures are presented in Table I.

TABLE I

| Application Temperature (°F) | Lap Shear (psi) | T-Peel (lbs./in. width) |
|---|---|---|
| 400 | 2285* | Zipper |
| 500 | 2280* | 16.4 |
| 600 | — | 31.0 |
| 700 | 1618 | 32.2 |
| 800 | — | 31.0 |

*Cold rolled steel strips used

The Lap Shear values were excellent across the entire temperature range with high values for T-Peel above 400°F and extremely high values from 600°F and up.

EXAMPLE II

A polyamide having an inherent viscosity of 0.24 made by interfacial polymerization of 4-chloroformylphthalic anhydride with 1,6-hexanediamine was vacuum dried and used as an adhesive in a manner similar to Example I. At an application temperature of 800°F. the Lap Shear value was 1960 psi and the T-Peel value was 35.0 lbs./in. width.

EXAMPLE III

A polyamide having an inherent viscosity of 0.7 made by interfacial polymerization of a mixture of the 1- and 2-monomethyl ester of the diacid chloride of trimellitic acid with 1,6-hexanediamine was vacuum dried and used as an adhesive in a manner similar to Example I. At an application temperature of 600°F the Lap Shear value was 1895 psi and the T-Peel value was 36.8 lbs./in. width. Hence this polyamide would be acceptable as an adhesive.

EXAMPLES IV and V

Two polyamides from the previous Examples varying only in terms of the choice of diamine were prepared and tested as heat activated adhesives. Example IV is a polyamide consisting of the trimellitate moiety combined with the 1,12-diamine dodecane moiety. Example V involves the trimellitate and ethylene diamine. Both polymers were synthesized by the interfacial polymerization technique resulting in a polyamide with an inherent viscosity of 0.23 for Example IV and 0.28 for Example V. Each were vacuum dried and used as an adhesive in a manner similar to Example I. The data for the respective polyamides at various application temperatures are presented in Table II.

TABLE II

| Ex. | Application Temperature (°F) | Lap Shear (psi) | T-Peel (lbs/in width) |
|---|---|---|---|
| IV | 420 | 2200 | Zipper |
| IV | 460 | 1795 | Zipper |
| IV | 500 | 2490 | Zipper |
| IV | 600 | — | 3.9 |
| IV | 700 | — | 3.3 |
| IV | 800 | 465 | 4.7 |
| V | 600 | — | 4.8 |
| V | 700 | 1125 | 7.7 |
| V | 800 | — | Zipper |

Although their adhesive strengths were not as good as the hexamethylene derived adhesives both were processable as heat activatable adhesives.

EXAMPLE VI

In order to demonstrate the advantage of having the adhesive in the polyamide form, a portion of a polymer produced in a manner similar to Example I having an inherent viscosity of 0.37 was first imidized by heating in a vacuum oven at 150°C overnight. The Lap Shear and T-Peel values for this polyimide were determined and compared to the values of the polyamide form of the same polymer measured under identical conditions. The Lap Shear for the polyamide form was 2,800 psi compared to 1,247 psi for the polyimide. The T-Peel value for the polyamide was 42 lbs/in width compared to 20.0 lbs/in width for the polyimide.

We claim:

1. A method of adhering surfaces comprising the steps of:
   a. placing between the surfaces to be bonded a resinous polyamide having an inherent viscosity greater than 0.2 and containing an aliphatic or cycloaliphatic diamine residue of up to about 20 carbon atoms copolymerized with a carboxylic aromatic acid residue having 3 carboxyl groups wherein two of said carboxyl groups are linked to said diamine residue through amide bonds and wherein the remaining unreacted carboxyl groups is in either the acid or ester form attached to a carbon atom which is adjacent to a second carbon atom of the same aromatic ring containing one of the carboxyl groups involved in said amide bond such that said unreacted carboxyl group can imidize with said amide bond,
   b. heating the surfaces and polyamide such as to induce imidization, and
   c. cooling the bonded surfaces.

2. A method of claim 1 wherein the aromatic acid is a tricarboxylic acid.

3. A method of claim 1 wherein a resinous polyamide has the formula:

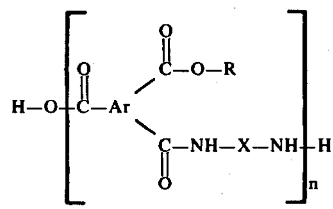

wherein Ar is an aromatic nucleus having the attached non-polymerized carboxy group vicinal to at least one of the carboxyl groups involved in an amide linkage, X is an aliphatic or cycloaliphatic hydrocarbon diradical having from about 2 to 20 carbon atoms, R is selected from a group consisting of hydrogen and alkyl radicals of up to about 6 carbons and *n* is an integer representing the number of repeating units which characterizes a polymer having a inherent viscosity greater than 0.2.

4. A method of claim 3 wherein X is a linear aliphatic diradical of 2 to 12 carbon atoms.

5. A method of claim 4 wherein Ar is a trivalent radical derived from benzene or naphthalene.

6. A method of claim 5 wherein X is hexamethylene.

7. A method of adhering surfaces comprising the steps of:
   a. placing a resinous polyamide made by polymerizing 4-chloroformylphthalic anhydride with 1,6-hexanediamine having essentially the formula:

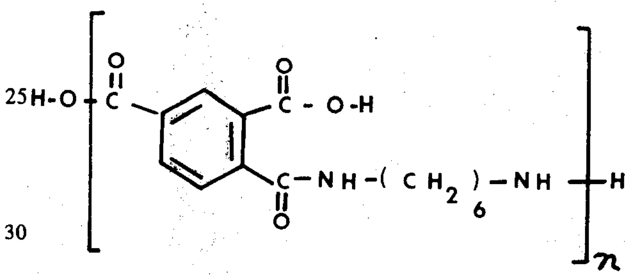

where *n* is an integer representing the number of repeating units which characterizes a polymer having an inherent viscosity greater than 0.2, between the surfaces to be bonded;
   b. heat activating the surfaces and polyamide under a compressive force at a temperature above 400°F. for at least 10 seconds; and
   c. cooling the bonded surfaces.

8. A method of claim 7 wherein the surfaces to be bonded are metallic.

9. A method of claim 8 wherein said heat activating is performed between about 580°F and 820°F for about 10 to 45 seconds.

10. A method of claim 9 wherein the surfaces to be bonded are steel.

* * * * *